United States Patent
Uchitani

(10) Patent No.: US 9,130,423 B2
(45) Date of Patent: Sep. 8, 2015

(54) ROTOR AND MOTOR

(75) Inventor: Yoshihiro Uchitani, Kyoto (JP)

(73) Assignee: NIDEC CORPORATION (JP)

(*) Notice: Subject to any disclaimer, the term of this patent is extended or adjusted under 35 U.S.C. 154(b) by 327 days.

(21) Appl. No.: 13/822,523

(22) PCT Filed: Sep. 29, 2011

(86) PCT No.: PCT/JP2011/005512
§ 371 (c)(1),
(2), (4) Date: Mar. 12, 2013

(87) PCT Pub. No.: WO2012/046422
PCT Pub. Date: Apr. 12, 2012

(65) Prior Publication Data
US 2013/0181564 A1    Jul. 18, 2013

(30) Foreign Application Priority Data
Oct. 4, 2010   (JP) ................................ 2010-224915

(51) Int. Cl.
*H02K 1/27*     (2006.01)
*H02K 1/22*     (2006.01)

(52) U.S. Cl.
CPC ................ *H02K 1/274* (2013.01); *H02K 1/276* (2013.01)

(58) Field of Classification Search
None
See application file for complete search history.

(56) References Cited

U.S. PATENT DOCUMENTS

| | | | |
|---|---|---|---|
| 4,075,522 A * | 2/1978 | Hoffman | 310/214 |
| 5,864,191 A * | 1/1999 | Nagate et al. | 310/156.54 |
| 2006/0082242 A1* | 4/2006 | Schill | 310/217 |
| 2007/0132335 A1* | 6/2007 | Ionel et al. | 310/261 |

FOREIGN PATENT DOCUMENTS

| | | |
|---|---|---|
| CN | 001447491 A | 10/2003 |
| CN | 101005218 A | 7/2007 |
| JP | 09074699 A | 3/1997 |
| JP | 11332146 A | 11/1999 |
| JP | 2000184639 A | 6/2000 |
| JP | 2001037123 A | 2/2001 |
| JP | 2008193809 A | 8/2008 |
| JP | 2009038930 A | 2/2009 |
| JP | 2010011738 A | 1/2010 |

OTHER PUBLICATIONS

International Search Report for International application No. PCT/JP2011/005512, Jun. 12, 2011.

* cited by examiner

*Primary Examiner* — Tran Nguyen
(74) *Attorney, Agent, or Firm* — Cantor Colburn LLP

(57) ABSTRACT

Magnets may be embedded in first recessed portions of a rotor core, and at least one stopper is each attached to an axial end of the rotor core. The rotor core may include second recessed portions each including a locking portion arranged to project inward therein. The stopper may include a base portion arranged to close the first recessed portions, and elastically deformable hook portions each arranged to be inserted into a separate one of the second recessed portions to be engaged with the locking portion. The rotor core may include first plates and second plates placed upon one another. Each first plate may include first locking elements each defining an opening, while each second plate may include second locking elements each defining a larger opening. The locking portions may be defined by arranging the second plates axially inward and placing the first plates upon the second plates.

17 Claims, 20 Drawing Sheets

ROTOR AND MOTOR

CROSS REFERENCE TO RELATED APPLICATIONS

This is a U.S. national stage of International Application No. PCT/JP2011/005512, filed on Sep. 29, 2011. Priority under 35 U.S.C. §119(a) and 35 U.S.C. §365(b) is claimed from Japanese Application No. 2010-224915, filed Oct. 4, 2010, the disclosure of which is also incorporated herein by reference.

TECHNICAL FIELD

The present invention relates to a rotor in which magnets are embedded, and a motor (more specifically, an interior permanent magnet (IPM) motor) including the rotor. In particular, the present invention relates to a structure for fitting the magnets to the rotor.

BACKGROUND

In a typical IPM motor, a plurality of through holes each extending in an axial direction are defined in an outer circumferential portion of a rotor core, and magnets are embedded in these through holes. The magnets are fixed to the rotor core through an adhesive.

A method of using the adhesive for fixing the magnets to the rotor core necessitates a series of processes including a process of application of the adhesive, a process of heating and thereby curing the adhesive, and a process of checking adhesion. This series of processes involves heavy burdens in terms of equipment and labor, and takes a lot of time to be completed. Moreover, this method is also unfavorable in terms of quality and costs.

In view of this, techniques described in JP-A 2008-193809, JP-A 2001-37123, and JP-A 11-332146 do not use the adhesive, but join and fix end plates to both ends of a rotor core through a plurality of rivets or the like.

JP-A 9-74699 discloses a rotor that is designed to achieve an improvement in ease of assembling, although this rotor is not a rotor of an IPM motor. This rotor includes a cylindrical magnet, a disc portion, and an inertia ring. Each of the disc portion and the inertia ring is attached to an opposite end portion of the magnet. Three engagement arms, each of which is arranged to extend in the axial direction, are arranged on an outer circumference of the disc portion. Each engagement arm includes a locking claw defined in an end thereof. The inertia ring includes recessed portions defined therein, and the locking claw of each engagement arm is brought into engagement with a separate one of the recessed portions to fit the inertia ring and so on to the magnet.

CITATION LIST

Patent Literature

[PTL 1]
JP-A 2008-193809
[PTL 2]
JP-A 2001-37123
[PTL 3]
JP-A 11-332146
[PTL 4]
JP-A 9-74699

However, the techniques described in JP-A 2008-193809 and so on involve a cumbersome joining process, and are not satisfactory in terms of productivity and quality stability. Moreover, end portions of the rivets project from the end plates, and therefore, any of the rivets may come into contact with a component arranged in the vicinity of the rivet in an assembled motor.

SUMMARY

According to at least an embodiment of the present invention, at least one stopper is attached to a rotor core to fix magnets to the rotor core.

Specifically, a rotor according to at least an embodiment of the present invention includes a cylindrical rotor core including a shaft hole extending in an axial direction, centered on a central axis, and having a shaft fixed therein; a plurality of magnets embedded in a peripheral portion of the rotor core; and at least one stopper each attached to a separate axial end of the rotor core.

The rotor core includes a plurality of first recessed portions each arranged to have a separate one of the magnets embedded therein, and a plurality of second recessed portions each including a locking portion. Each of the first and second recessed portions is arranged to extend substantially in parallel with the shaft hole. Each of the at least one stopper includes a base portion arranged to close the first recessed portions; and a plurality of hook portions each arranged on the base portion to be elastically deformable, and each arranged to be inserted into a separate one of the second recessed portions to be engaged with the locking portion thereof.

The rotor core is defined by a plurality of annular plates placed upon one another, the plates including first plates and second plates. Each of the first plates includes first locking elements each defining an opening arranged to define a portion of a separate one of the second recessed portions. Each of the second plates includes second locking elements each defining an opening arranged to define a portion of a separate one of the second recessed portions. The opening of each second locking element has a larger area than that of the opening of each first locking element. The locking portion of each second recessed portion is defined by arranging the second plates axially inward and placing the first plates upon the second plates.

According to the rotor having the above-described structure, each of the at least one stopper can be easily attached to the rotor core by inserting each hook portion into a separate one of the second recessed portions, and bringing the hook portion into engagement with the locking portion thereof. Once each of the at least one stopper is attached to the rotor core, the first recessed portions are closed thereby, so that the magnets embedded in the rotor core are fixed.

According to at least an embodiment of the present invention, a plurality of grooves are defined in an outer circumference of a rotor core, and these grooves are utilized to attach at least one stopper to the rotor core.

Specifically, a rotor according to at least an embodiment the present invention includes a cylindrical rotor core including a central shaft hole extending in an axial direction, centered on a central axis, and having a shaft fixed therein; a plurality of magnets embedded in a peripheral portion of the rotor core; and at least one stopper each attached to a separate axial end of the rotor core. The rotor core includes a plurality of first recessed portions each arranged to extend in parallel with the shaft hole, and each arranged to have a separate one of the magnets embedded therein; and a plurality of elongated grooves each arranged to extend in parallel with the shaft hole in a portion of an outer circumferential surface of the rotor core which is circumferentially located between a separate pair of adjacent ones of the first recessed portions. Each of the elongated grooves includes a locking portion recessed radially inward defined therein.

Each of the at least one stopper includes a base portion arranged to close the first recessed portions; and a plurality of hook portions each arranged on the base portion to be elastically deformable, and each arranged to enter into a separate one of the elongated grooves to be engaged with the locking portion thereof. The rotor core is defined by a plurality of annular plates placed upon one another, the plates including third plates and fourth plates. Each of the third plates includes third locking elements each arranged to define a portion of a separate one of the elongated grooves. Each of the fourth plates includes fourth locking elements each arranged to define a portion of a separate one of the elongated grooves, each fourth locking element being recessed to a greater extent than each third locking element. The locking portion of each elongated groove is defined by arranging the fourth plates axially inward and placing the third plates upon the fourth plates.

This rotor having the above-described structure is able to achieve effects similar to those of the rotor according to the above-described embodiment.

According to at least an embodiment of the present invention, the magnets embedded in the rotor core can be fixed by utilizing the at least one stopper without use of an adhesive. Therefore, the rotors and so on which are excellent in terms of productivity, costs, and so on can be provided.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EMBODIMENTS

Hereinafter, embodiments of the present invention will be described in detail with reference to the accompanying drawings. Note that the following description is essentially meant to be merely illustrative of the present invention, and should not be construed to restrict the scope, applications, or purposes of the present invention.

Figure 1:
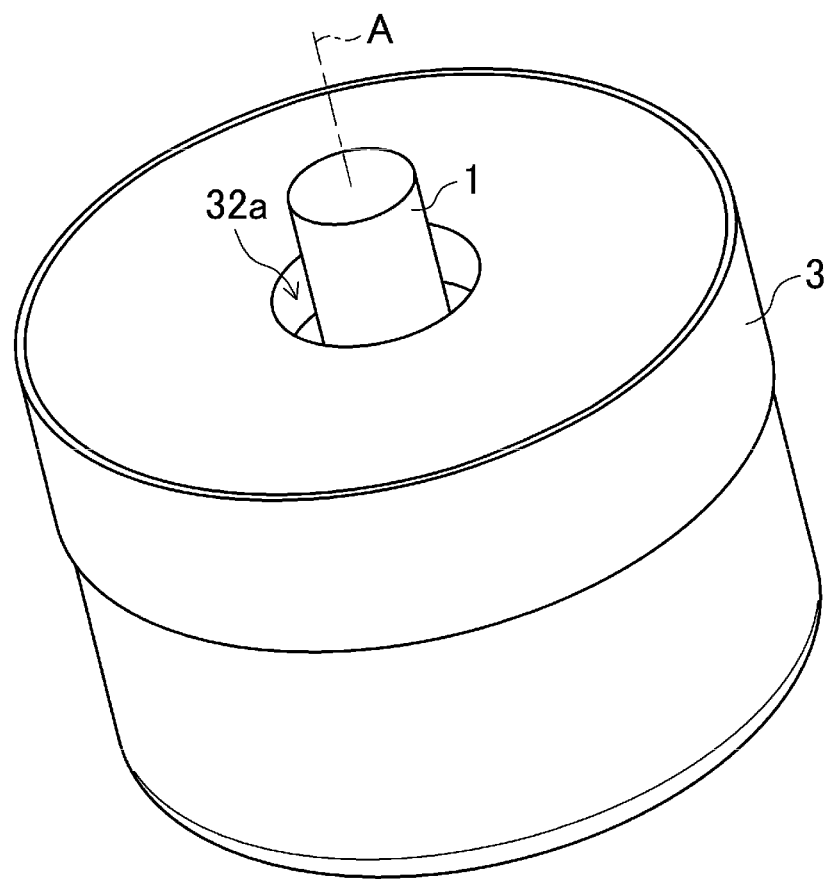
FIG. 1 is a schematic perspective view of a motor according to at least an embodiment of the present invention.
Figure 2:
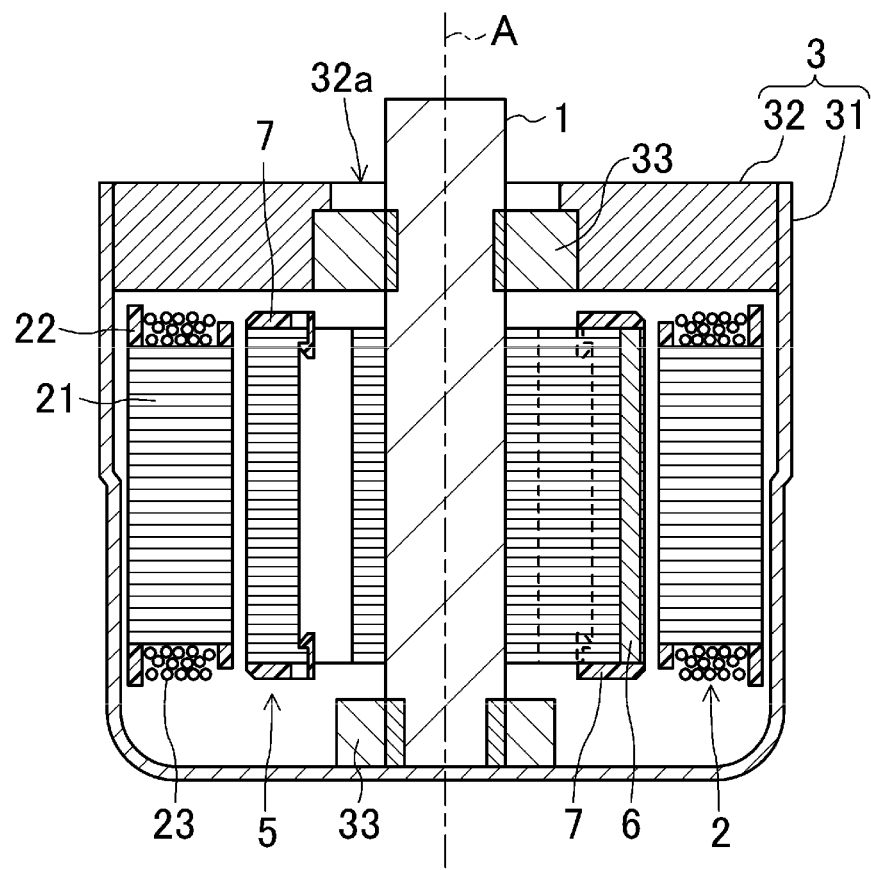
FIG. 2 is a schematic cross-sectional view of the motor.

FIGS. 1 and 2 illustrate a basic structure of a motor according to an embodiment of the present invention. The motor includes a shaft 1, a rotor 5, a stator 2, a motor case 3, and so on. The motor case 3 is arranged to contain the shaft 1, the rotor 5, the stator 2, and so on.

The motor case 3 includes a cup-shaped case body 31 and a disc-shaped lid member 32. The lid member 32 includes a through hole 32a defined in a center thereof. The lid member 32 is inserted in an opening of the case body 31, and integrally fitted to the case body 31 to close the opening thereof. Bearings 33 are arranged in the through hole 32a and on a central portion of a bottom surface of the case body 31, which is axially opposed to the through hole 32a.

The shaft 1 is supported by the motor case 3 through the bearings 33 with a top portion of the shaft 1 arranged to project out of the motor case 3 through the through hole 32a. The shaft 1 is arranged to be rotatable about a central axis A.

The stator 2 is an assembly made up of a plurality of components including a stator core 21, an insulator 22, a plurality of coils 23, and so on. The stator 2 is arranged to have a cylindrical outer shape. The stator 2 is fixed to an inner circumferential surface of the case body 31. The rotor 5 is arranged radially inward of the stator 2 with a slight gap defined between the rotor 5 and the stator 2. The rotor 5 is fixed to a middle portion of the shaft 1 such that the rotor 5 is coaxial with the shaft 1. Although not shown in the figures, electronic components, such as a Hall IC, etc., are arranged in the vicinity of an end portion of the rotor 5.

Figure 3:
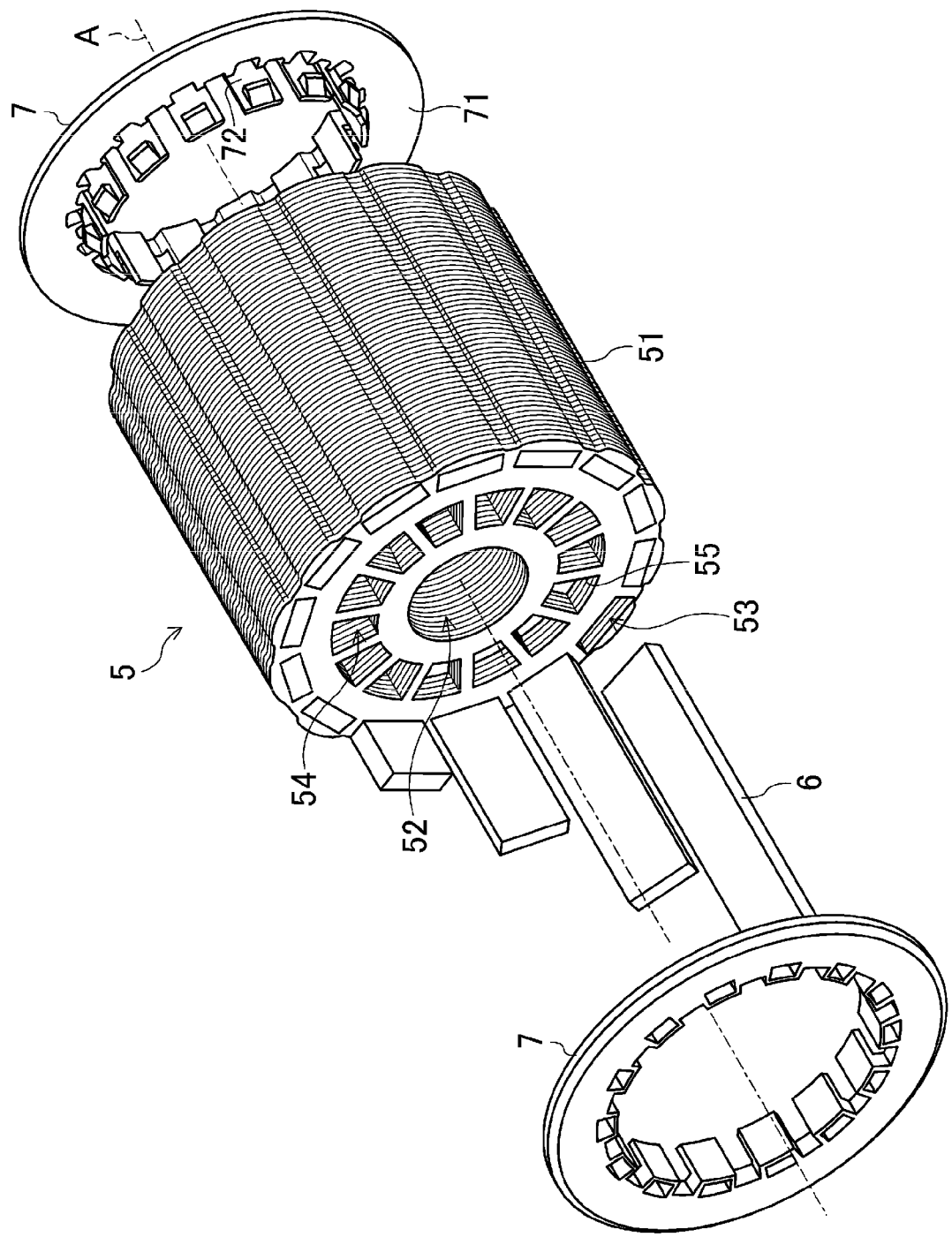
FIG. 3 is a schematic exploded perspective view of a rotor according to the embodiment.

FIG. 3 illustrates the structure of the rotor 5. As illustrated in FIG. 3, the rotor 5 includes a rotor core 51, a plurality of (fourteen in the present embodiment) magnets 6, and a pair of stoppers 7.

The rotor core 51 is a cylindrical member made up of a plurality of annular metallic plates 60 placed upon one another. The rotor core 51 includes a through hole (i.e., a shaft hole 52) extending in an axial direction defined in a center thereof. The shaft 1 is press fitted into the shaft hole 52. The shaft hole 52 is centered on the central axis A, and arranged to extend in the axial direction. Note that, for the sake of convenience in description, a direction in which the shaft hole 52 is arranged to extend will be referred to by the term "axial direction", "axial", or "axially" as needed, that directions perpendicular to or substantially perpendicular to the shaft hole 52 will be referred to by the term "radial direction", "radial", or "radially" as needed, and that a circumferential direction about the shaft hole 52 will be referred to by the term "circumferential direction", "circumferential", or "circumferentially" as needed, when indicating a direction in description of any member or portion.

The rotor core 51 according to the present embodiment includes fourteen first recessed portions 53 and fourteen second recessed portions 54 defined therein, each of which is arranged to extend substantially in parallel with the shaft hole 52.

The magnets 6 are embedded in a peripheral portion of the rotor core 51. In other words, the magnets 6 are embedded in the first recessed portions 53. Each of the first recessed portions 53 is arranged to define a first through hole extending in an axial direction through the rotor core 51. In addition, each first recessed portion 53 is arranged to be substantially rectangular in a cross-section perpendicular to the axial direction. Each first recessed portion 53 is defined in an outer circumferential portion of the rotor core 51 such that a longitudinal direction of the first recessed portion 53 in the cross-section substantially coincides with a circumferential direction about the central axis A. Moreover, the first recessed portions 53 are arranged at regular intervals in the circumferential direction.

The rotor core 51 includes the second recessed portions 54 defined therein. This contributes to a reduction in weight of the rotor core 51. Each of the second recessed portions 54 is arranged to define a second through hole extending in the axial direction through the rotor core 51. In addition, the second recessed portions 54 are arranged to radiate from an area surrounding the shaft hole 52, and each second recessed portion 54 is arranged to be substantially in the shape of a trapezoid in a cross-section perpendicular to the axial direction. The second recessed portions 54 are arranged at regular intervals in the circumferential direction and radially inward of the first recessed portions 53. The second recessed portions 54 are arranged to be circumferentially displaced from the first recessed portions 53 such that each second recessed portion 54 is circumferentially arranged in the middle of a separate pair of adjacent ones of the first recessed portions 53. This arrangement contributes to an improvement in a magnetic property of the rotor 5.

Figure 8:
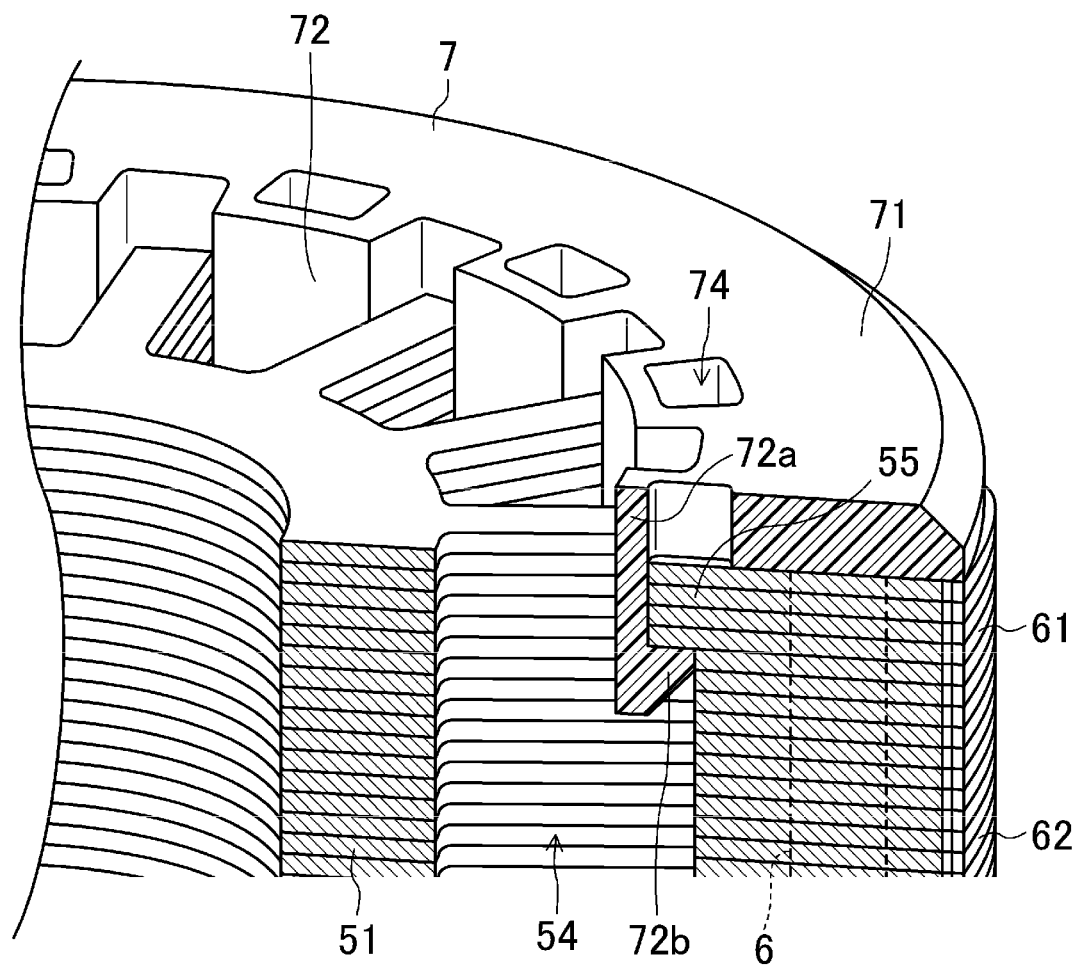
FIG. 8 is a schematic diagram illustrating a portion of the rotor.

According to the present embodiment, the stoppers 7 are fitted to the second recessed portions 54. Referring to FIG. 8, each second recessed portion 54 is provided with a locking portion 55 arranged to project radially inward in the second recessed portion 54.

Hook portions 72, which will be described below, are engaged with the locking portions 55. The locking portions 55, each of which has the aforementioned structure, are defined by utilizing the plates 60 placed upon one another. In more detail, in the present embodiment, two types of plates 60 (i.e., first plates 61 and second plates 62) which have different forms of holes (i.e., second recessed portion elements) arranged to define portions of the second recessed portions 54 are used as the plates 60 which together define the rotor core 51.

Figure 4:
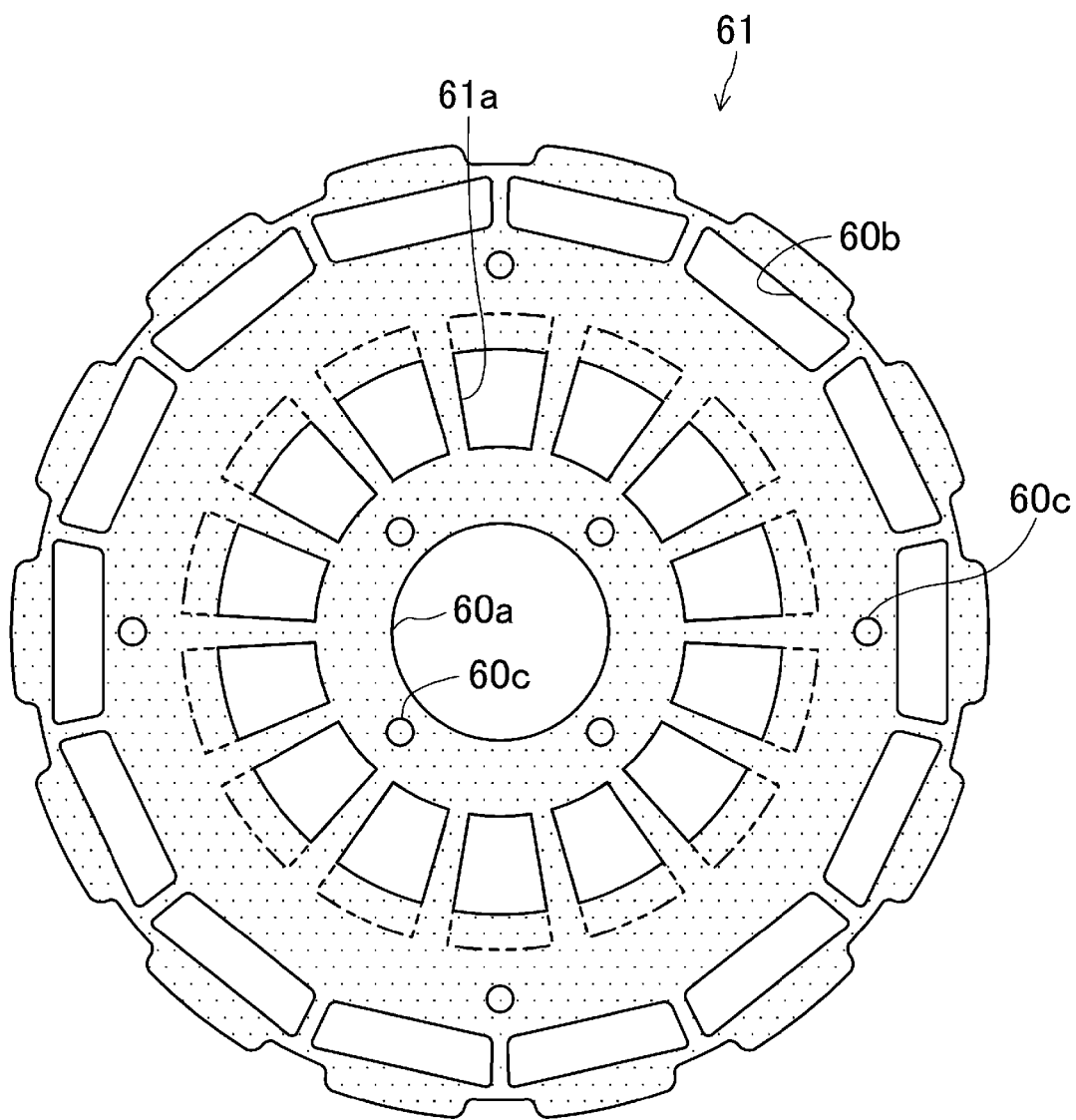
FIG. 4 is a schematic plan view of a first plate according to the embodiment.
Figure 5:
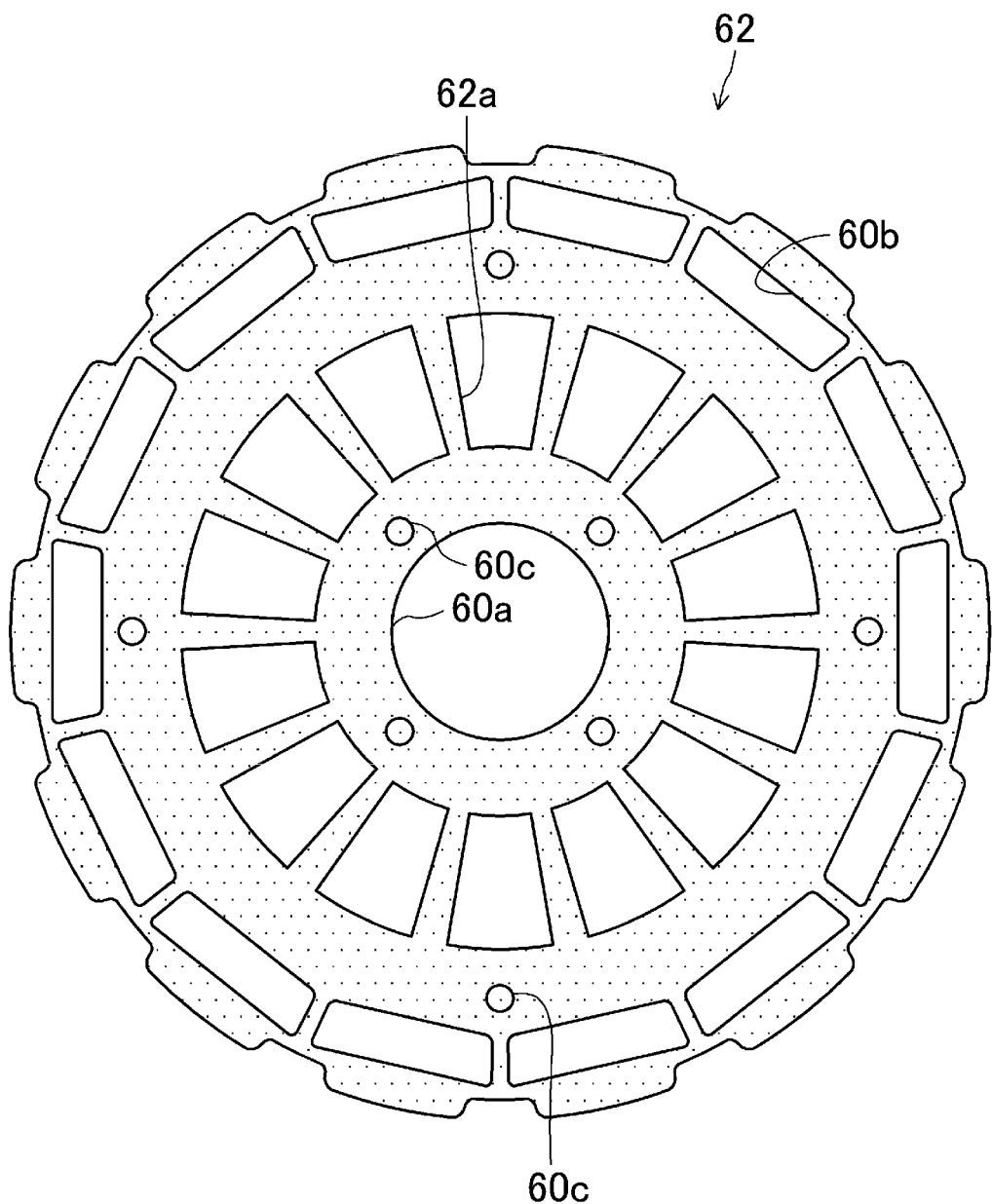
FIG. 5 is a schematic plan view of a second plate according to the embodiment.

FIG. 4 illustrates the first plate 61. FIG. 5 illustrates the second plate 62. Each of the plates 61 and 62 is produced by subjecting a steel sheet to press working, for example. The first and second plates 61 and 62 are arranged to be substantially identical in dimensions and shape except that the second recessed portion elements of the first and second plates 61 and 62 have different forms. Specifically, a hole (i.e., a shaft hole element 60a) that defines a portion of the shaft hole 52 and holes (i.e., first recessed portion elements 60b) that define portions of the first recessed portions 53 are defined at predetermined positions and in identical shape and dimensions in each of the plates 60.

Figure 6:
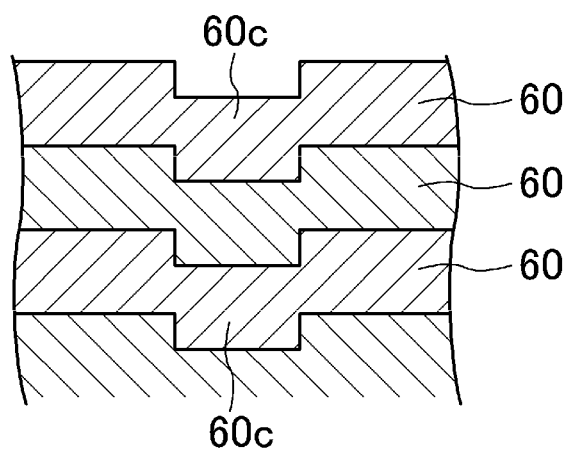
FIG. 6 is a schematic cross-sectional view illustrating a portion of a rotor core according to the embodiment.

In addition, each plate 60 includes core projection portions 60c defined therein. Each core projection portion 60c is arranged to be recessed in one surface of the plate 60 and to project in an opposite surface of the plate 60. The core projection portions 60c are arranged at a plurality of positions in the plate 60 such that the core projection portions 60c are distributed evenly over the plate 60. Referring to FIG. 6, the core projection portions 60c of each plate 60 are crimped into and fixed to recesses of the core projection portions 60c of an adjacent one of the plates 60, so that the plates 60 are positioned relative to one another. The plates 60 are placed upon one another while being positioned relative to one another in the above-described manner. Furthermore, the shaft 1 is press fitted into the shaft hole 52, so that the plates 60 are securely fixed to the shaft 1. There is, therefore, no probability of any of the plates 60 placed upon one another coming off, or of a gap being defined between any adjacent plates 60.

Each first plate 61 includes first locking elements 61a each defining an opening defined therein. Each second plate 62 includes second locking elements 62a each defining an opening defined therein. Each second locking element 62a is arranged to extend farther radially outward than each first locking element 61a. In other words, the opening of the second locking element 62a has a larger area than that of the opening of the first locking element 61a.

Referring to FIG. 8, according to the present embodiment, several (four in the present embodiment) first plates 61 are placed upon one another to define each of both axially outermost layers of the rotor core 51 which define axial end surfaces of the rotor core 51, such that each axially outermost layer is arranged to have a predetermined thickness. The second plates 62 are placed upon one another continuously axially inward of the first plates 61. Four of the first plates 61 are arranged in each axial end portion of the rotor core 51, while the second plates 62 are arranged therebetween. Inner surfaces of locking holes defined by the first plates 61 are thereby arranged to be flush with one another. This makes it possible to smoothly guide a claw portion of each hook portion until the claw portion is brought into engagement with the locking portion, leading to improved workability.

Figure 9:
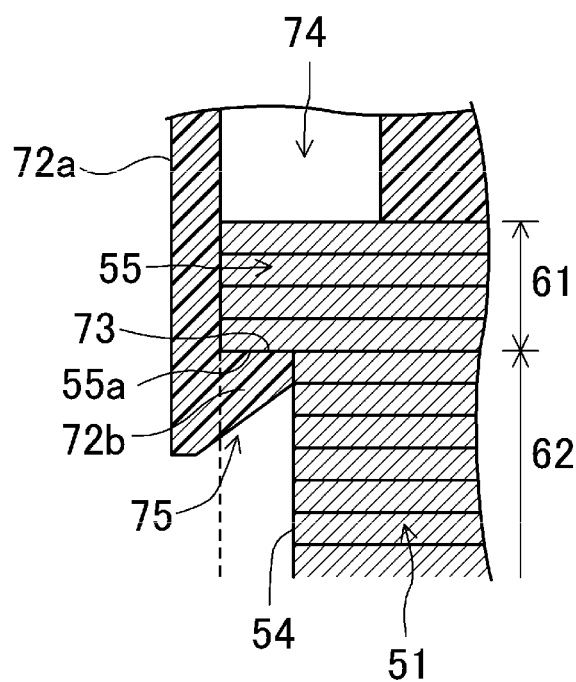
FIG. 9 is a diagram illustrating a hook portion according to the embodiment.

The locking portion 55, which is arranged to project radially inward, is defined in a radially outer portion of each end portion of each second recessed portion 54. It is originally difficult to shape such a hole having a recessed inner circumferential surface. However, the locking portions 55 can be easily defined by placing the plates 60 upon one another in the above-described manner. Moreover, each plate 60 has a substantially equal thickness, and this contributes to improving precision in the thickness of each locking portion 55. It is easy to adjust the thickness of each locking portion 55 by adjusting the number of first plates 61 to be placed upon one another. Referring to FIG. 9, a boundary between the locking portion 55 and the second recessed portion 54 has a definite shape, and it is possible to define a flat locking surface 55a perpendicular to the axial direction with high precision in the locking portion 55.

Each of the magnets 6 is arranged in the shape of a band plate and to be rectangular in a cross-section. The magnets 6 are arranged in the circumferential direction about the central axis A. Each magnet 6 is arranged to have a cross-section having a size substantially equal to or slightly smaller than that of a cross-section of each first recessed portion 53. Each magnet 6 is embedded in a separate one of the first recessed portions 53.

Each of the stoppers 7 is an injection molded article produced by injecting and solidifying a molten resin. The stoppers 7 are arranged to prevent the magnets 6 embedded in the rotor core 51 from coming off. In the present embodiment, each one of the stoppers 7 is attached to a separate axial end of the rotor core 51.

Figure 7:
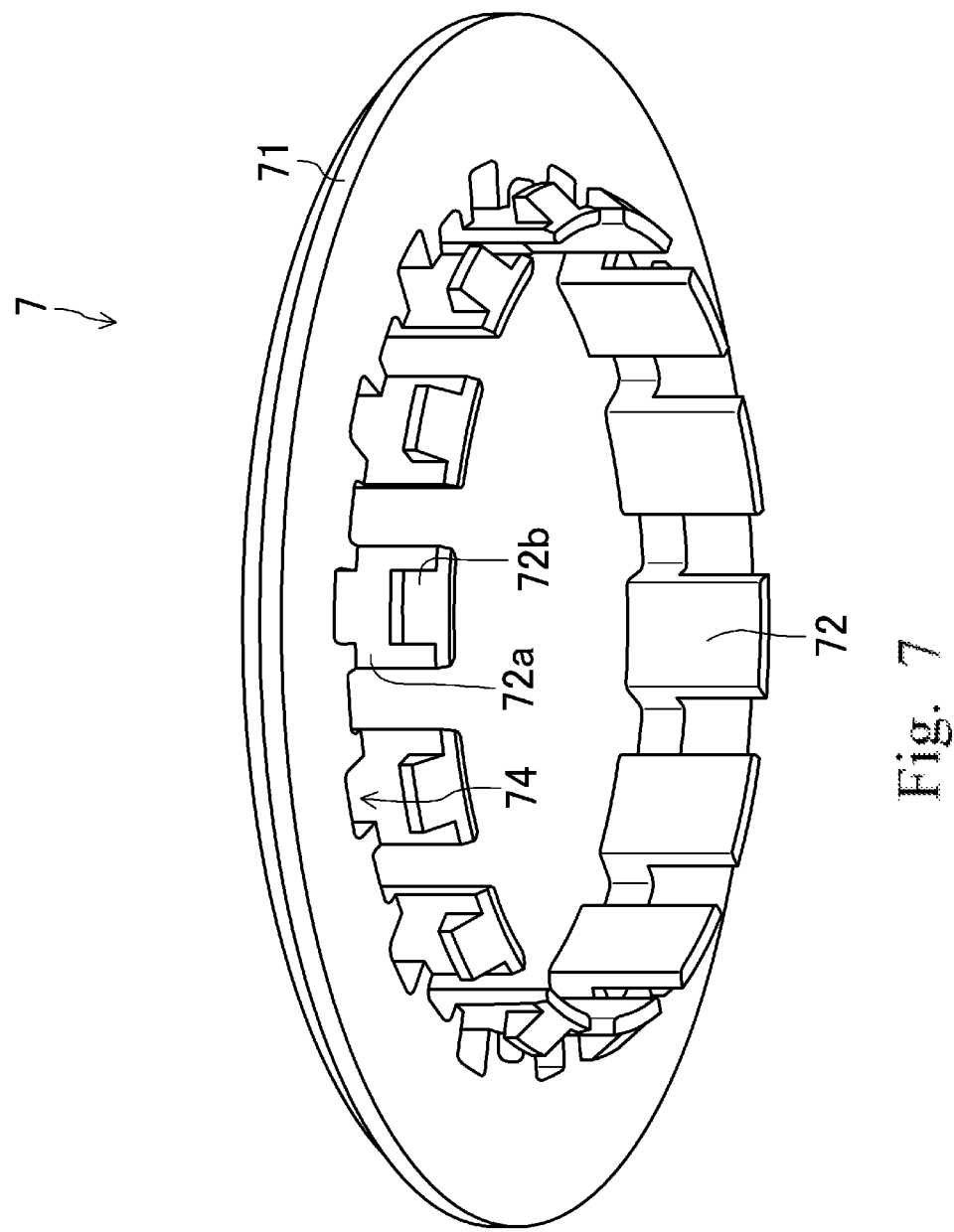
FIG. 7 is a schematic perspective view of a stopper according to the embodiment.

Referring to FIG. 7, each stopper 7 includes a base portion 71 and the hook portions 72. The base portion 71 is arranged in an annular shape and centered on the central axis A. Each of the hook portions 72 is arranged to extend axially inward from an inner circumferential edge of the base portion 71, and is arranged to be capable of elastic deformation (with an elastic force). The base portion 71 is arranged to be in contact with a peripheral portion of one of the axial end surfaces of the rotor core 51 to close each of the first recessed portions 53. The hook portions 72 are arranged at fourteen positions corresponding to positions of the second recessed portions 54. In detail, the hook portions 72 are circumferentially arranged at the same intervals as those of the second recessed portions 54, and are radially arranged such that each of the hook portions 72 will be inserted into a separate one of the second recessed portions 54 while being in contact with a radially outer edge of the second recessed portion 54.

Each hook portion 72 includes an arm portion 72a and a claw portion 72b. The arm portion 72a is arranged in the shape of a rectangular plate and to be continuous with the base portion 71. The claw portion 72b is arranged to project radially outward from an end portion of the arm portion 72a to be mated with one of the locking portions 55. Referring to FIG. 9, an upper portion of the claw portion 72b is provided with a flat engagement surface 73. Referring to FIG. 7, the circumferential width of the claw portion 72b centered on the central axis A is arranged to be smaller than the circumferential width of the arm portion 72a. Moreover, the claw portion 72b is arranged in the circumferential middle of the arm portion 72a. Referring to FIGS. 7, 8, and 9, the base portion 71 includes base portion through holes 74 defined therein in order to facilitate molding of the stopper 7. Each of the base portion through holes 74 is defined in a portion of the base portion 71 which abuts on a base of the arm portion 72a of a separate one of the hook portions 72. The base portion through hole 74 is axially opposed to the claw portion 72b, and the circumferential width of the base portion through hole 74 is arranged to be equal to or greater than the circumferential width of the claw portion 72b.

Referring to FIG. 8, the circumferential width of the arm portion 72a is arranged to be substantially equal to the circumferential width of the second recessed portion 54. Therefore, after the hook portions 72 are inserted into the second recessed portions 54, the stopper 7 is incapable of turning around the central axis A relative to the rotor core 51, leading to prevention of a wobble of the stopper 7. Moreover, because the hook portions 72 are inserted into and engaged with the second recessed portions 54, the stopper 7 is prevented from being displaced excessively away from the corresponding axial end portion of the rotor core 51. Therefore, the stopper 7 is effectively prevented from coming into contact with any component or the like arranged in the vicinity thereof when arranged in the motor.

Furthermore, referring to FIG. 9, the end portion of the arm portion 72a is provided with an inclined portion 75. The inclined portion 75 includes an inclined surface arranged to extend from an end of the arm portion 72a across the claw portion 72b obliquely with respect to the central axis A. Because of the provision of the inclined portion 75, when the hook portion 72 is inserted into the second recessed portion 54, the inclined surface is brought into contact with an edge of the locking portion 55, and the hook portion 72 is guided farther into the second recessed portion 54 while elastic deformation of the arm portion 72a is promoted.

Therefore, the stopper 7 can be easily attached to the rotor core 51 by simply aligning the hook portions 72 with the second recessed portions 54 and fitting the stopper 7 to the rotor core 51. When the stopper 7 is attached to the rotor core 51, the arm portion 72a of each hook portion 72 is inserted into a corresponding one of the second recessed portions 54 while being slightly elastically deformed radially inward. Then, once the claw portion 72b of the hook portion 72 passes the locking portion 55 and is located axially inward of the locking portion 55, the arm portion 72a is caused to shift radially outward by an elastic restoration force, so that the claw portion 72b enters into a space axially inward of the locking portion 55. The engagement surface 73 of the claw portion 72b is thus brought into close contact with the locking surface 55a of the locking portion 55, so that the hook portion 72 is brought into engagement with the locking portion 55, and the stopper 7 is thereby securely fixed to the rotor core 51. Thus, the magnets 6 embedded in the rotor core 51 are easily retained by the stoppers 7 without use of an adhesive.

The claw portion 72b is arranged to project radially outward from the arm portion 72a. Therefore, if the base portion 71 is pressed upward by any magnet 6, a force acts in such a direction that the engagement surfaces 73 are brought into closer contact with the locking surfaces 55a. The magnets 6 are thereby prevented from coming off with high stability.

Figure 10:
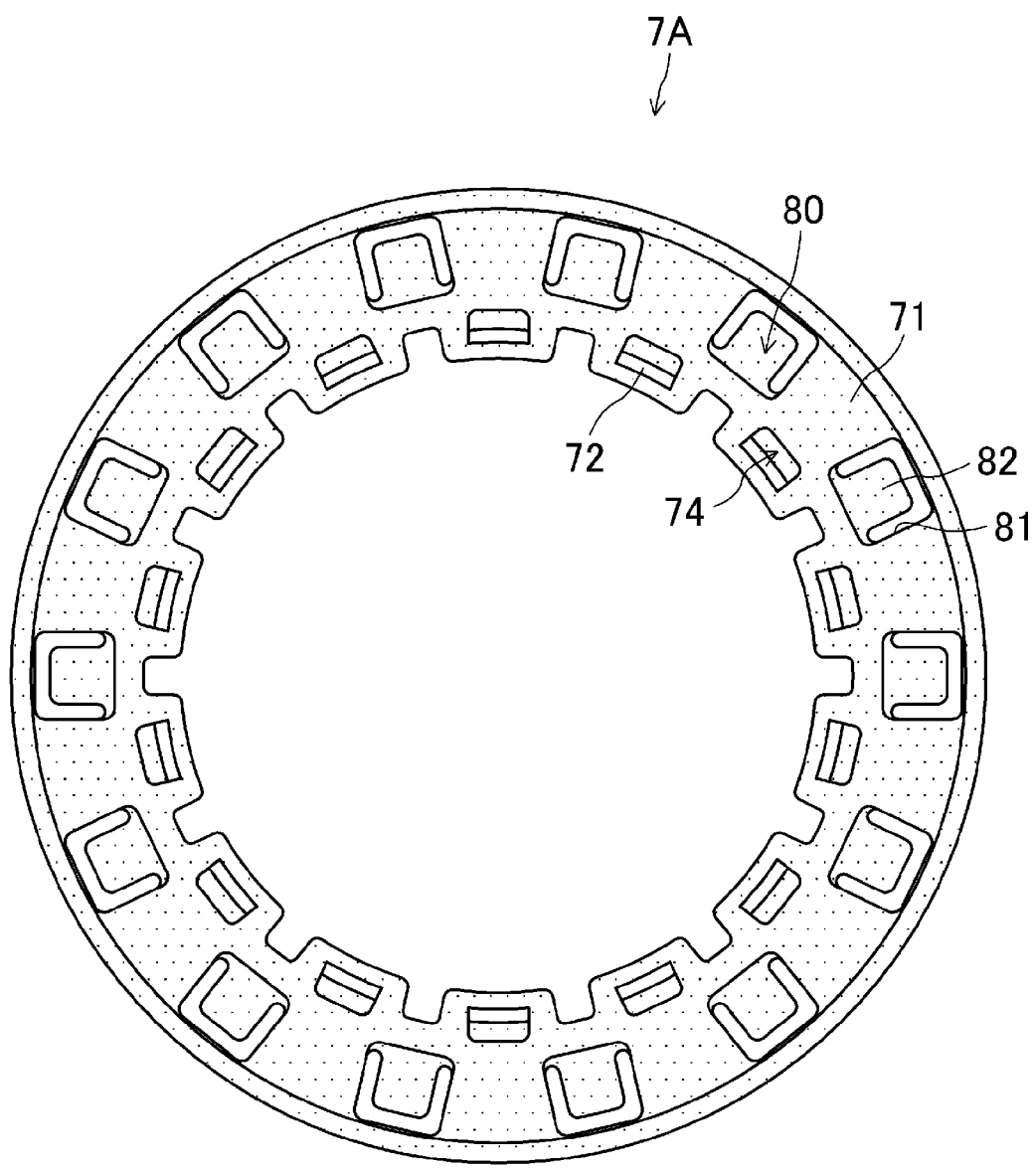
FIG. 10 is a schematic plan view illustrating an example modification of the stopper.
Figure 11:
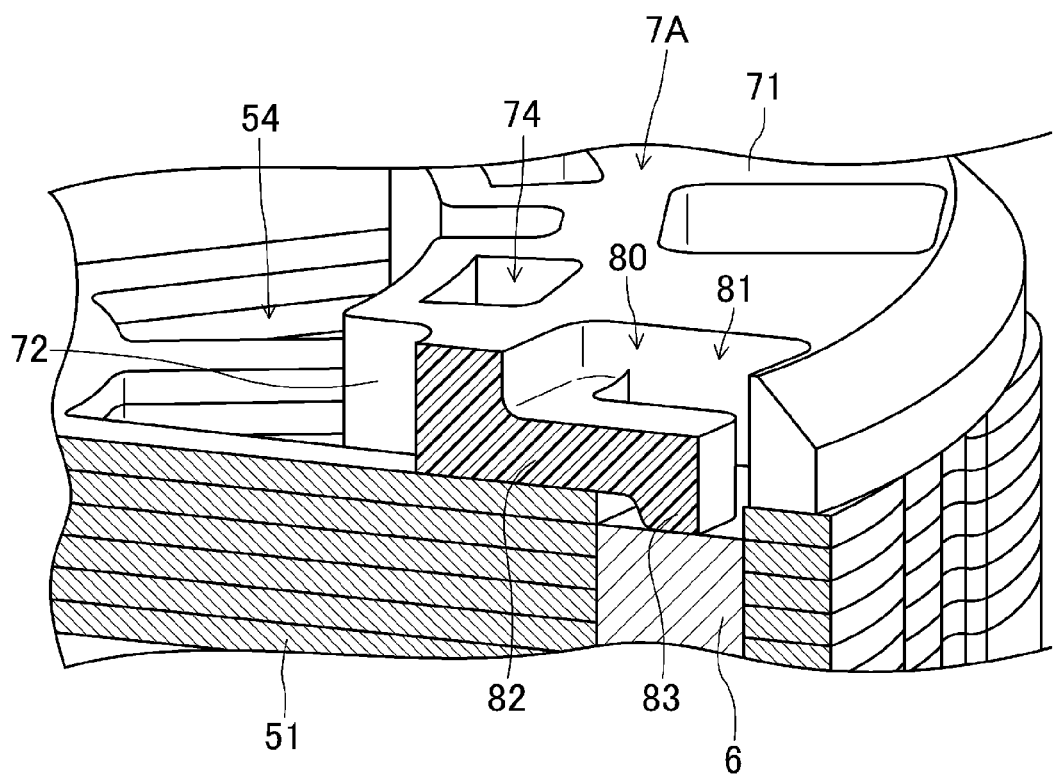
FIG. 11 is a schematic diagram illustrating a portion of the rotor provided with the stopper illustrated in FIG. 10.

FIGS. 10 and 11 each illustrate a stopper 7A, which is an example modification of the stopper 7. Each of the magnets 6 is typically arranged to have a length slightly smaller than that of the rotor core 51 so that an end portion of the magnet 6 may not protrude above the rotor core 51. In this case, a slight axial gap is defined in the first recessed portion 53 in which the magnet 6 is embedded. This gap may cause a shake of the magnet 6 depending on the purpose or the like of the motor.

Accordingly, the stopper 7A is provided with magnet support portions 80 to prevent a shake of any of the magnets 6. Each of the magnet support portions 80 is arranged to be capable of elastic deformation, and is arranged to support an end portion of a corresponding one of the magnets 6 embedded in the first recessed portions 53. Note that the stopper 7A is substantially similar to the stopper 7 according to the above-described embodiment except for the magnet support portions 80. Accordingly, like members or portions are designated by like reference numerals, and redundant description is omitted.

The magnet support portions 80 are arranged at fourteen positions in the base portion 71 which correspond to positions of the first recessed portions 53. Each of the magnet support portions 80 includes a window portion 81, a projecting portion 82, and a contact portion 83. The contact portion 83 is arranged to project axially inward from a radially outer end portion of the projecting portion 82.

The window portion 81 is an opening defined in a portion of the base portion 71 which is opposed to each of the first recessed portions 53. The projecting portion 82 is arranged to project inward from a radially inner end portion of the window portion 81, and is arranged to have a decreased thickness to be capable of elastic deformation. The contact portion 83 is arranged on a top end portion of the projecting portion 82. The contact portion 83 is arranged to project axially inward from the top end portion of the projecting portion 82.

When the stopper 7A is attached to the rotor core 51, the contact portion 83 of each magnet support portion 80 is brought into contact with the end portion of a corresponding one of the magnets 6, and the projecting portion 82 of the magnet support portion 80 undergoes an elastic deformation. As a result, the magnet 6 is supported by the contact portion 83 such that the magnet 6 is unmovable in the axial direction, with the magnet 6 being pressed by the contact portion 83.

Figure 12:
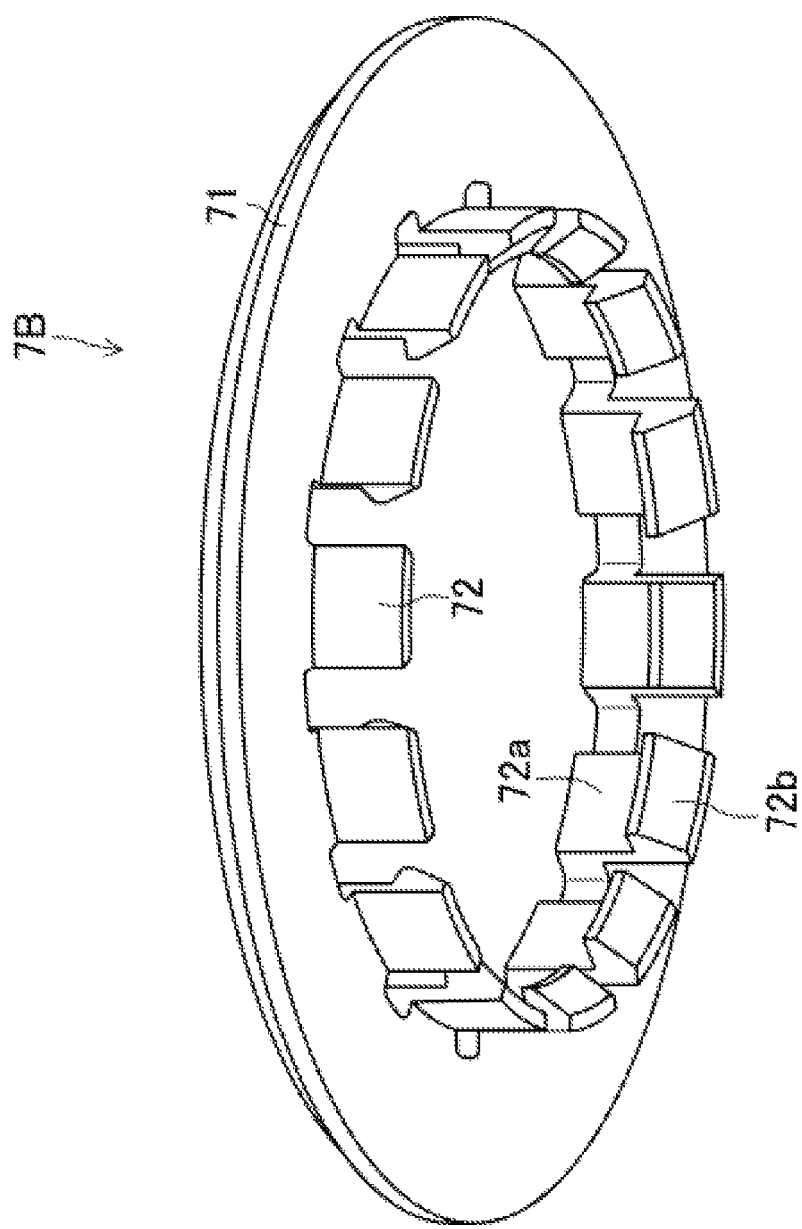
FIG. 12 is a schematic perspective view illustrating another example modification of the stopper.
Figure 13:
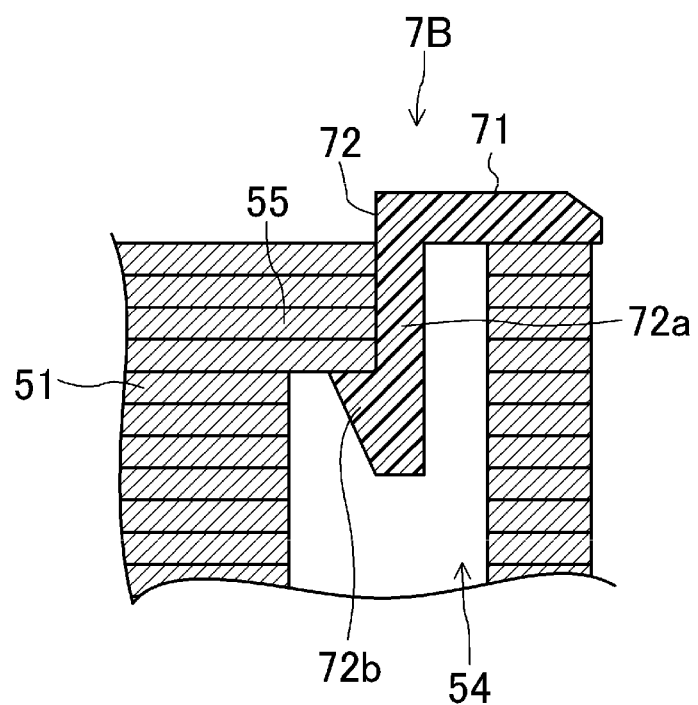
FIG. 13 is a schematic cross-sectional view illustrating a portion of the rotor provided with the stopper illustrated in FIG. 12.

FIGS. 12 and 13 each illustrate a stopper 7B, which is another example modification of the stopper 7. The stopper 7B is different from the stopper 7 according to the above-described embodiment in that the claw portion 72*b* of each hook portion 72 is arranged to project radially inward. Each second locking element 62*a* is arranged to extend farther radially inward than each first locking element 61*a*. So, the locking portion 55 of each second recessed portion 54 is defined in a radially inner portion of the second recessed portion 54 to be mated with the claw portion 72*b*. This arrangement of the claw portion 72*b* eliminates a need for the base portion through holes 74 in a molding process, facilitating the molding process. Moreover, the claw portion 72*b* can be arranged to have the same width as that of the arm portion 72*a*.

Figure 14:
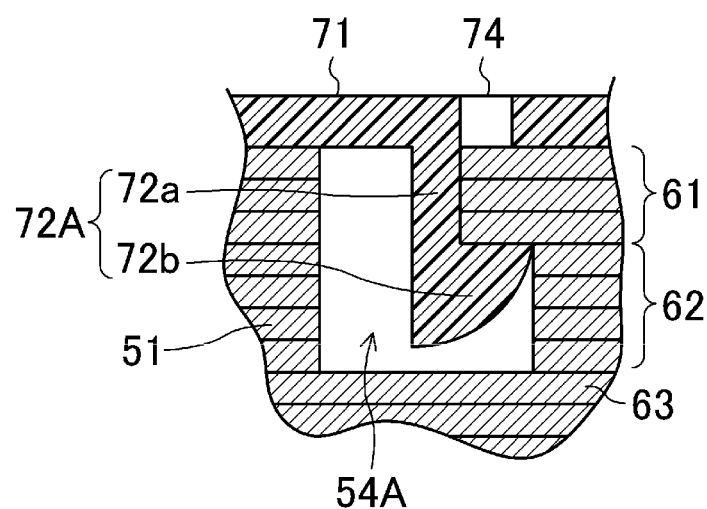
FIG. 14 is a schematic cross-sectional view illustrating an example modification of the hook portion.
Figure 15:
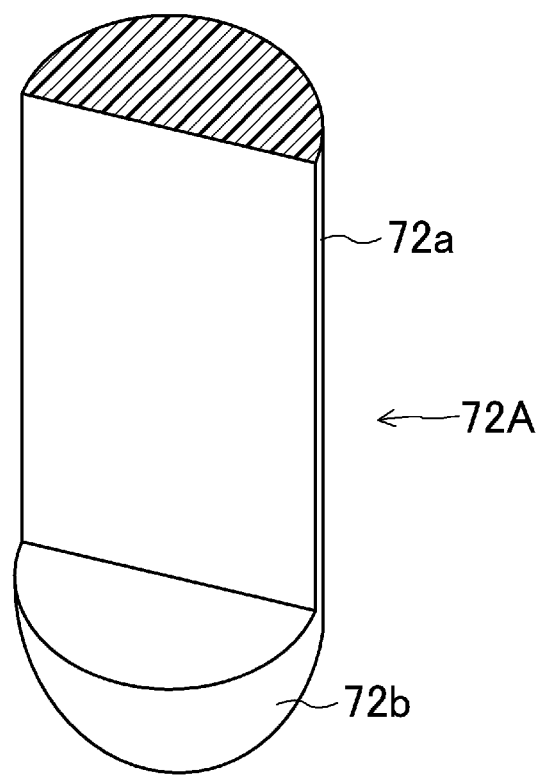
FIG. 15 is a schematic perspective view of the hook portion illustrated in FIG. 14.

FIGS. 14 and 15 illustrate a hook portion 72A and a second recessed portion 54A, which are example modifications of the hook portion 72 and the second recessed portion 54, respectively. Each hook portion 72A according to the present modification is arranged on a surface of the base portion 71 which faces an end surface of the rotor core 51. The hook portion 72A includes an arm portion 72*a* and a claw portion 72*b*. The arm portion 72*a* is semicircular in a cross-section. The claw portion 72*b* is also semicircular in a cross-section, and is arranged on a side of the arm portion 72*a* on which the locking portion is arranged. The rotor core 51 includes second recessed portions 54A defined at positions corresponding to those of the hook portions 72A.

While each second recessed portion according to the above-described embodiment is arranged to define a through hole, this is not essential to the present invention. Second recessed portions according to other embodiments of the present invention may be arranged to not define through holes. Referring to FIG. 14, each second recessed portion 54A is a recessed portion that has a bottom and does not extend through the rotor core 51. The second recessed portion 54A can be defined, for example, by using plates 60 (i.e., non-hole plates 63) that include no second recessed portion elements defined therein, and arranging the non-hole plates 63 axially inward of the second plates 62.

As described above, the forms of the hook portions 72 and the second recessed portions 54 may be designed in a variety of manners in accordance with specifications.

FIGS. 16, 17, 18, and 19 illustrate a rotor according to another embodiment of the present invention. A stopper is attached to a rotor core of this rotor by using a plurality of grooves defined in an outer circumference of the rotor core. Note that the basic structure of the rotor according to the present embodiment is similar to that of the rotor according to the above-described embodiment or the like. Therefore, differences from the above-described embodiment will be described in detail below.

Figure 16:
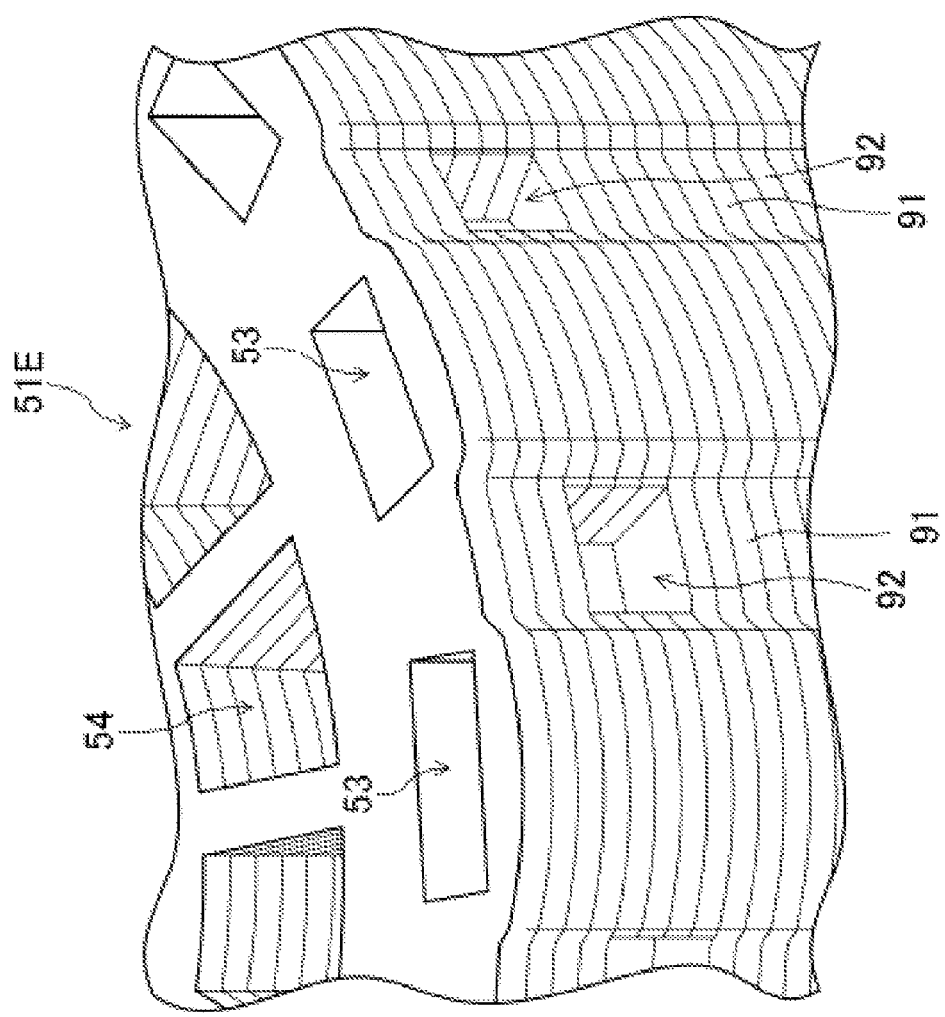
FIG. 16 is a schematic diagram illustrating a portion of a rotor core according to at least an embodiment of the present invention.

Referring to FIG. 16, a rotor core 51E according to the present embodiment includes a shaft hole 52, a plurality of first recessed portions 53, and a plurality of elongated grooves 91 defined therein. Each of the elongated grooves 91 is arranged to extend in parallel with the shaft hole 52, and is defined in a portion of an outer circumferential surface of the rotor core 51E which is circumferentially located between a separate pair of adjacent ones of the first recessed portions 53. Moreover, a recess 92 (i.e., a locking portion) recessed radially inward is defined in the vicinity of each axial end of each elongated groove 91.

These recesses 92 are defined by utilizing two types of plates (i.e., third plates 93 and fourth plates 94) between which the forms of recesses (i.e., elongated groove elements) that define portions of the elongated grooves 91 differ.

Figure 19:
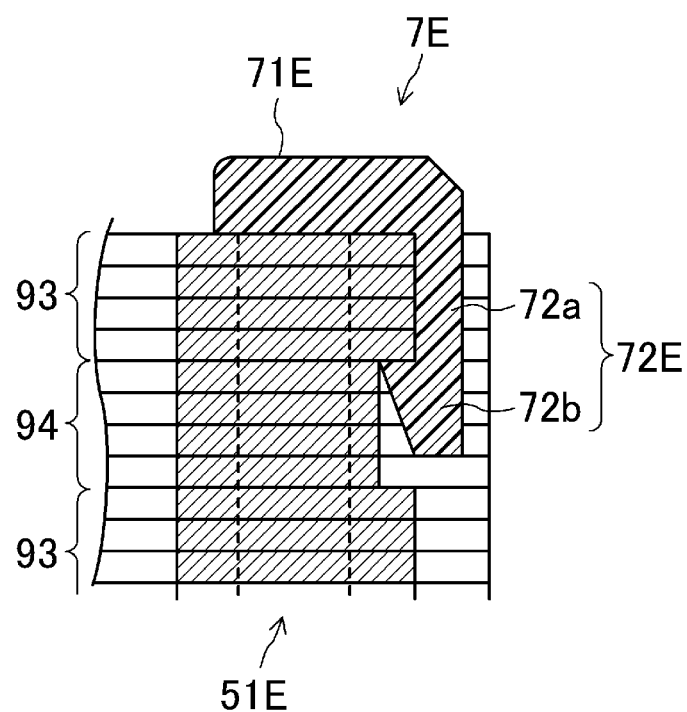
FIG. 19 is a schematic cross-sectional view of the rotor taken along line X-X in FIG. 18.

Specifically, an outer circumference of each of the third plates 93 includes recessed third locking elements defined therein, while an outer circumference of each of the fourth plates 94 includes recessed fourth locking elements defined therein. Each of the fourth locking elements is recessed to a greater extent than each of the third locking elements. Referring to FIG. 19, according to the present embodiment, several (four in the present embodiment) third plates 93 are placed upon one another to define an axially outermost layer of the rotor core 51E which defines an axial end surface of the rotor core 51E, such that the axially outermost layer is arranged to have a predetermined thickness. Several to tens of (four in the present embodiment) fourth plates 94 are placed upon one another continuously axially inward of the third plates 93. In addition, additional third plates 93 are placed upon one another continuously axially inward of the fourth plates 94.

Figure 17:
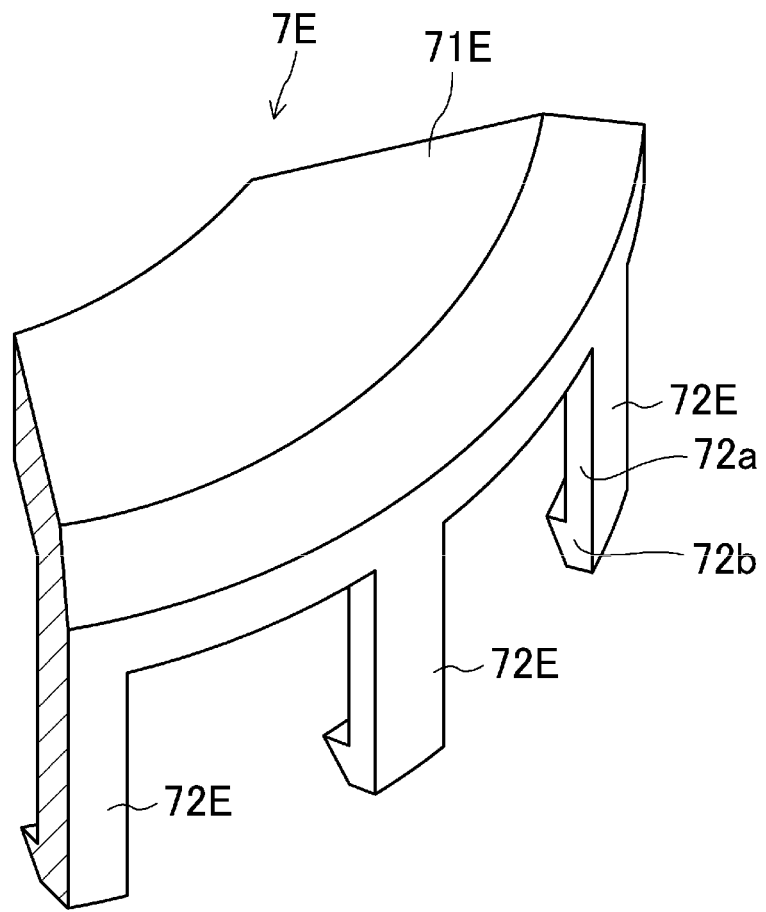
FIG. 17 is a schematic perspective view illustrating a portion of a stopper according to the embodiment.
Figure 18:
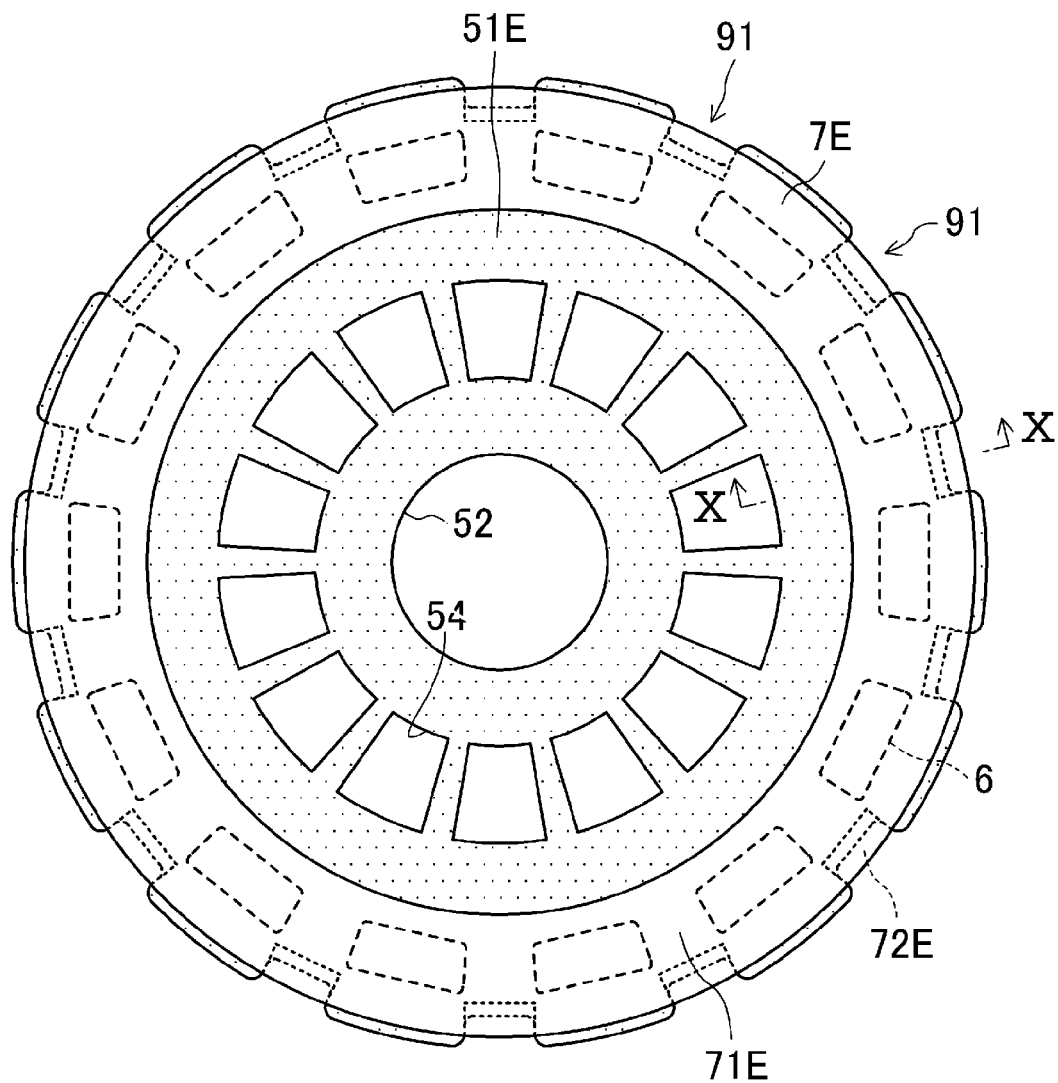
FIG. 18 is a schematic plan view of a rotor according to the embodiment.

Referring to FIGS. 17 and 18, a stopper 7E according to the present embodiment includes an annular base portion 71E and hook portions 72E. Each of the hook portions 72E is arranged to extend perpendicularly from an outer circumferential edge of the base portion 71E, and is arranged to be capable of elastic deformation. The base portion 71E is arranged to have a diameter smaller than the diameter (i.e., the maximum diameter) of the rotor core 51E so that the stopper 7E may not project from an outer circumference of the rotor core 51E.

The hook portions 72E are arranged at fourteen positions corresponding to positions of the elongated grooves 91 so that the hook portions 72E may enter into the elongated grooves 91. Each of the hook portions 72E includes an arm portion 72*a* and a claw portion 72*b*. The arm portion 72*a* is arranged in the shape of a rectangular plate and to be continuous with the base portion 71E. The claw portion 72*b* is arranged to project radially inward from an end portion of the arm portion 72*a* to be mated with one of the recesses 92. No base portion through hole 74 is provided in the present embodiment. Note, however, that base portion through holes 74 may be provided in modifications of the present embodiment.

The arm portion 72*a* is arranged to have a width substantially equal to the width of the elongated groove 91. Therefore, after the hook portions 72E are inserted into and engaged with the elongated grooves 91, the stopper 7E is incapable of turning around the central axis A relative to the rotor core 51E, leading to prevention of a wobble of the stopper 7E.

Therefore, the stopper 7E can be easily attached to the rotor core 51E by simply aligning the hook portions 72E with the elongated grooves 91 and fitting the stopper 7E to the rotor core 51E. Referring to FIG. 19, when the stopper 7E is attached to the rotor core 51E, the claw portion 72*b* of each hook portion 72E is fitted into a corresponding one of the recesses 92, so that the stopper 7E is securely fixed to the rotor core 51E.

The present embodiment has an advantage in strength because the hook portions 72E are locked in the vicinity of the magnets 6.

A motor including any of the rotors according to the above-described embodiments is able to achieve a reduction in size or the like because it is possible to dispose electronic components and the like even in the close vicinity of ends of the rotor.

Note that the present invention is not limited to the above-described embodiments and the above-described modifications thereof. It is to be understood by those skilled in the art that a variety of other variations and modifications are possible without departing from the scope and spirit of the present invention.

Note that there may be only one stopper 7 in other embodiments of the present invention. For example, a non-hole plate with no portions of the first recessed portions 53 defined therein may be arranged at one axial end of the rotor core 51. In this case, ends of the first recessed portions 53 on one axial side are closed by the non-hole plate, and therefore, it is enough to insert the magnets 6 into the first recessed portions 53 through ends thereof on an opposite axial side, and thereafter attaching the stopper 7 to the rotor core 51 to close the ends of the first recessed portions 53 on the opposite axial side.

As described above, the plates 60 used to together define the rotor core 51 are not limited to the first plates 61, the second plates 62, and the like. Other types of plates 60 in which portions of second recessed portions 54 and/or elongated grooves 91 having different dimensions and/or shapes are defined may be used in combination.

The forms of the first recessed portions and the magnets are not limited to those according to the above-described embodiments and the above-described modifications thereof. For example, V-shaped first recessed portions, each of which is arranged in the shape of the letter "V" in a cross-section, may be arranged in the circumferential direction, with magnets embedded in the V-shaped first recessed portions.

Figure 20:
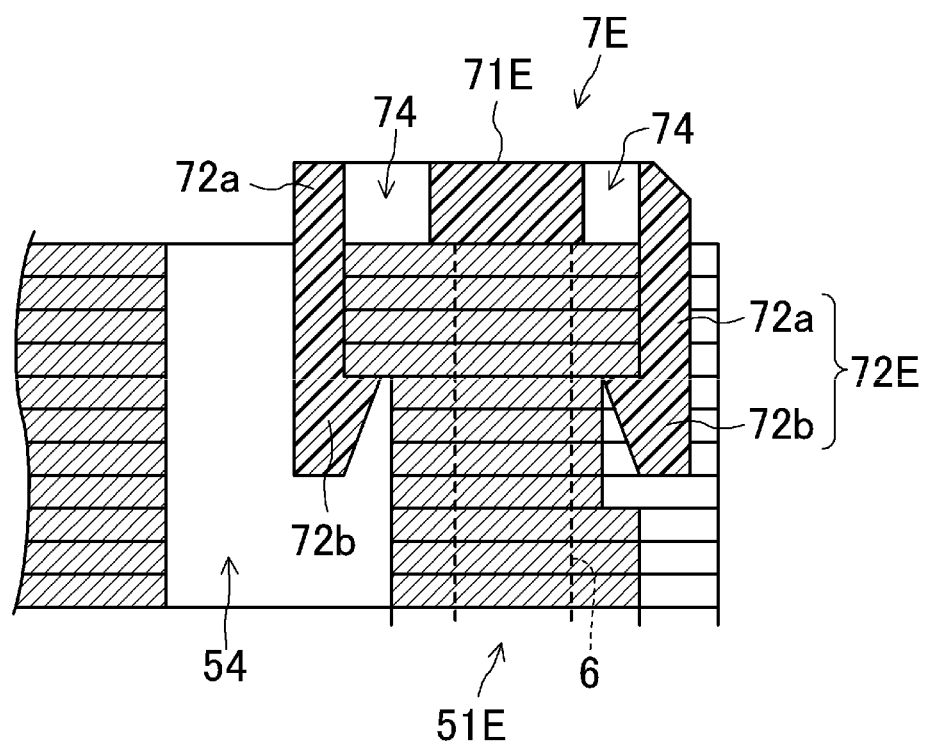
FIG. 20 is a schematic cross-sectional view illustrating a portion of a rotor according to at least an embodiment of the present invention.

For example, referring to FIG. 20, it is more that the rotor core should be provided with both the second recessed portions and the elongated grooves, each of which includes the locking portion as described above, and that the stopper should be provided with inner and outer hook portions designed for the second recessed portions and the elongated grooves, respectively.

While each of the first recessed portions is arranged to define a through hole in each of the above-described embodiments, this is not essential to the present invention. Each first recessed portion may be arranged to not define a through hole in other embodiments of the present invention. In other words, each first recessed portion may be a recessed portion that has a bottom and does not extend through the rotor core in other embodiments of the present invention.

Locking portions may be arranged not only in radial end portions of locking holes but also in circumferential end portions of the locking holes.

It is possible to arrange the locking portions in the circumferential end portions of the locking holes by, for example, arranging the circumferential width of each first locking element to be smaller than the circumferential width of each second locking element.

Rotors and so on according to embodiments of the present invention are usable, for example, in drive apparatuses installed in automobiles, such as electric power steering systems and so on.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A motor comprising:
   a stator;
   a shaft;
   a rotor comprising:
   a cylindrical rotor core centered on a central axis, the rotor core comprising:
   a shaft hole centered on the central axis and having the shaft fixed therein;
   a plurality of first recessed portions;
   a plurality of second recessed portions, each of the plurality of second recessed portions comprising a locking portion;
   wherein each of the plurality of first recessed portions and each of the plurality of second recessed portions are arranged to extend substantially in parallel with the shaft hole;
   a plurality of magnets, each of the plurality of magnets being disposed in one of the plurality of first recessed portions; and
   a stopper attached to an axial end of the rotor core, the stopper comprising:
   a base portion configured to close each of the plurality of first recessed portions; and
   a plurality of hook portions arranged on the base portion;
   wherein each of the plurality of hook portions is elastically deformable; and
   each of the plurality of hook portions is configured to be inserted into one of the plurality of second recessed portions and to be engaged with the locking portion therein;
   the rotor core further comprises a plurality of annular plates arranged coaxially, the plurality of annular plates comprising first plates and second plates;
   each of the first plates comprises a plurality of first locking elements, wherein each of the plurality of first locking elements comprises an opening configured to define a portion of one of the plurality of second recessed portions;
   each of the second plates comprises a plurality of second locking elements, wherein each of the plurality of second locking elements comprises an opening configured to define a portion of one of the plurality of second recessed portions, the opening of each of the plurality of second locking elements having a larger area than an area of the opening of each of the plurality of first locking elements; and
   the locking portion of each of the plurality of second recessed portions is configured by arranging the second plates axially inward from the first plates.

2. The motor according to claim 1, wherein
the plurality of first recessed portions is arranged in a circumferential direction about the central axis;
the plurality of second recessed portions is arranged in the circumferential direction and radially inward of the first recessed portions;
the locking portion of each of the plurality of second recessed portions is defined in a radially inner portion or a radially outer portion of the second recessed portion, with each of the plurality of second locking elements being arranged to extend farther radially inward or farther radially outward than each of the plurality of first locking elements;
the base portion is arranged in an annular shape, and arranged to be in contact with a peripheral portion of an axial end surface of the rotor core;

each of the plurality of hook portions comprises:
an elastically deformable arm portion arranged to extend perpendicularly from an inner circumferential edge of the base portion; and
a claw portion arranged to project radially inward or radially outward from an end portion of the arm portion to be mated with the locking portion; and
the claw portion of each hook portion is engaged with the locking portion of a corresponding one of the second recessed portions to attach the stopper to the rotor core.

3. The motor according to claim 2, wherein
the locking portion of each of the plurality of second recessed portions is defined in the radially outer portion of the second recessed portion, with each of the plurality of second locking elements being arranged to extend farther radially outward than each first locking element; and
the claw portion of each of the plurality of hook portions is arranged to project radially outward.

4. The motor according to claim 2, wherein the arm portion of each of the plurality of hook portions is arranged to have a circumferential width substantially equal to a circumferential width of each of the plurality of second recessed portions.

5. The motor according to claim 1, wherein each of the plurality of second recessed portions is circumferentially arranged in a middle of a pair of adjacent first recessed portions.

6. The motor according to claim 1, wherein the base portion comprises base portion through holes each defined at a position axially opposed to the claw portion of one of the plurality of hook portions, the circumferential width of each base portion through hole being a size equal to that of the claw portion.

7. A motor comprising:
a stator;
a shaft;
a cylindrical rotor core centered on a central axis, the rotor core comprising:
  a shaft hole centered on the central axis and having the shaft fixed therein;
  a plurality of first recessed portions;
  a plurality of elongated grooves provided in an outer circumferential surface of the rotor core;
  wherein each of the plurality of first recessed portions and each of the plurality of elongated grooves are arranged to extend substantially in parallel with the shaft hole;
  each of the plurality of elongated grooves is provided between a pair of adjacent first recessed portions in a circumferential direction; and
  each of the plurality of elongated grooves is provided with a locking portion recessed radially inward;
a plurality of magnets, each of the plurality of magnets being disposed in one of the plurality of first recessed portions; and
a stopper attached to an axial end of the rotor core, the stopper comprising:
  a base portion configured to close each of the plurality of first recessed portions; and
  a plurality of hook portions arranged on the base portion;
  wherein each of the plurality of hook portions is elastically deformable; and
  each of the plurality of hook portions is configured to be inserted into one of the plurality of elongated grooves and to be engaged with the locking portion therein;

the rotor core further comprises a plurality of annular plates arranged coaxially, the plurality of annular plates comprising third plates and fourth plates;
each of the third plates comprises a plurality of third locking elements, wherein each of the plurality of third locking elements comprises a portion of one of the plurality of elongated grooves;
each of the fourth plates comprises a plurality of fourth locking elements, wherein each of the plurality of fourth locking elements comprises a portion of one of the plurality of elongated grooves, each fourth locking element being recessed to a greater extent than each third locking element; and
the locking portion of each of the plurality of elongated grooves is configured by arranging the fourth plates axially inward and from the third plates.

8. The motor according to claim 6, wherein one or more of the first plates are arranged to define an axially outermost layer of the rotor core, while the second plates are placed upon one another continuously axially inward thereof.

9. The motor according to claim 8, wherein the base portion comprises elastically deformable magnet support portions each arranged to support an end portion of one of the plurality of magnets embedded in the plurality of first recessed portions.

10. The motor according to claim 9, wherein each of the magnet support portions comprises:
a window portion arranged to define an opening in a portion of the base portion which is axially opposed to one of the plurality of first recessed portions;
an elastically deformable projecting portion arranged to project inward from an edge of the window portion; and
a contact portion arranged on a top end portion of the projecting portion to be in contact with the end portion of the magnet.

11. The motor according to claim 8, further comprising a second stopper, wherein each stopper is attached to a separate axial end of the rotor core.

12. The motor according to claim 3, wherein the arm portion of each of the plurality of hook portions is arranged to have a circumferential width substantially equal to a circumferential width of each of the plurality of second recessed portion.

13. The motor according to claim 2, wherein each of the plurality of second recessed portions is circumferentially arranged between a pair of adjacent first recessed portions.

14. The motor according to claim 4, wherein the base portion comprises base portion through holes each defined at a position axially opposed to the claw portion of one of the plurality of hook portions, the circumferential width of each base portion through hole being a size equal to or greater than that of the claw portion.

15. The motor according to claim 7, wherein one or more of the third plates are arranged to define an axially outermost layer of the rotor core, while the fourth plates are placed upon one another continuously axially inward thereof.

16. The motor according to claim 15, wherein the base portion comprises elastically deformable magnet support portions each arranged to support an end portion of one of the plurality of magnets.

17. The motor according to claim 16, wherein each of the magnet support portions comprises:
a window portion arranged to define an opening in a portion of the base portion which is axially opposed to one of the plurality of first recessed portions;
an elastically deformable projecting portion arranged to project inward from an edge of the window portion; and a contact portion arranged on a top end portion of the projecting portion to be in contact with the end portion of the magnet.

* * * * *